(12) United States Patent
Hundt

(10) Patent No.: US 8,832,176 B1
(45) Date of Patent: Sep. 9, 2014

(54) METHOD AND SYSTEM FOR PROCESSING A LARGE COLLECTION OF DOCUMENTS

(75) Inventor: Christopher James Hundt, Berkeley, CA (US)

(73) Assignee: Google Inc., Mountain View, CA (US)

(*) Notice: Subject to any disclaimer, the term of this patent is extended or adjusted under 35 U.S.C. 154(b) by 124 days.

(21) Appl. No.: 13/467,932

(22) Filed: May 9, 2012

(51) Int. Cl.
   *G06F 15/16* (2006.01)
(52) U.S. Cl.
   USPC .......................................................... 709/201
(58) Field of Classification Search
   USPC .......................................................... 709/201
   See application file for complete search history.

(56) References Cited

U.S. PATENT DOCUMENTS

| | | | |
|---|---|---|---|
| 2007/0038726 A1* | 2/2007 | Vaidya et al. | 709/219 |
| 2007/0233865 A1* | 10/2007 | Garbow et al. | 709/226 |
| 2010/0262975 A1* | 10/2010 | Reysa et al. | 718/105 |

* cited by examiner

Primary Examiner — Wing F Chan
Assistant Examiner — Andrew Woo
(74) Attorney, Agent, or Firm — Sterne, Kessler, Goldstein & Fox P.L.L.C.

(57) ABSTRACT

Methods, systems, and articles of manufacture for scalable processing of collections of files are disclosed. These include retrieving a first file processing job from a job list by a first task, decomposing the first file processing job to sub jobs by the first task when a workload associated with the first file processing job exceeds a threshold, listing the sub-jobs in the job list, monitoring of at least one result storage location by the first task for results from execution of respective ones of the sub-jobs by one or more second tasks, detecting completion of the first processing job based upon the monitoring, and outputting a result for the first file processing job based upon the results from execution of respective ones of the sub-jobs. The job list comprising file processing jobs is populated by a main task.

15 Claims, 7 Drawing Sheets

File Processing Job Entry/Record 300

| Record ID 302 | File List 304 | Query List 306 | Aggregation Criteria 308 | Result Location 310 | Task Identifier 312 | Timestamp 314 | ... |

FIG. 3

Job Entry 402

| 404 | | 406 | |
|---|---|---|---|
| J1 | ..... | T2 | |
| | | | |
| J1.1 | | T2 | |
| J1.2 | | T4 | |
| J1.2.1 | | T5 | |
| J1.2.2 | | | |

METHOD AND SYSTEM FOR PROCESSING A LARGE COLLECTION OF DOCUMENTS

BACKGROUND

1. Field

This disclosure relates generally to data processing using concurrent processes.

2. Background

The range of applications that require analyzing collections of documents is vast, and the available solutions are often specific to the type and the size of the application. An exemplary application may be to select emails that have certain keywords or expressions from a large email archive. Email archives may be analyzed for the presence of certain keywords or expressions for various purposes including as part of electronic discovery in litigations. The email archive of a corporation, for example, may include millions of emails, and may result in searching hundreds of millions of small documents (e.g., individual emails) for the presence of selected keywords and expressions.

Distributed and/or parallel processing are often used to speed up the performance of applications such as those mentioned above. For example, groups of these documents may be searched in parallel. In some conventional parallel systems, the programmer specifies how the processes are allocated to parallel processes. However, static specification of subtask assignment may not scale to large numbers. In some other conventional parallel systems, a master process may break up the jobs to sub-jobs and assign each sub-job to a process.

SUMMARY OF EMBODIMENTS

Methods, systems, and articles of manufacture for scalable processing of collections of files are disclosed. These include retrieving a first file processing job from a task list by a first file processing task of a plurality of file processing tasks, decomposing the first file processing job to a plurality of sub jobs by the first file processing task when a workload associated with the first file processing job exceeds a threshold, listing the plurality of the sub-jobs in the task list, monitoring of at least one result storage location by the first file processing task for results from execution of respective ones of the plurality of sub-jobs by one or more second file processing tasks, detecting completion of the first processing job based upon the monitoring, and outputting a result for the first file processing job based upon the results from execution of respective ones of the plurality of sub-jobs. The task list comprising file processing jobs is populated by a main task.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

The present disclosure is generally directed to methods and systems to efficiently detect the presence of predetermined keywords or expressions in large document archives, such as, for example, large email archives. Embodiments are directed to distributed systems in which multiple processes may process individual documents or groups of documents from the archive in parallel. Embodiments are further directed to flexibly allocate work items among processes based upon dynamic conditions of the system.

Example applications of the embodiments include, but are not limited to, searching of document archives. Document archives may include collections of emails, and any files stored on an organization's user's hard drives and storage directories. A litigation support system to search document archives for discovery purposed may be an application of these embodiments.

Figure 1A:
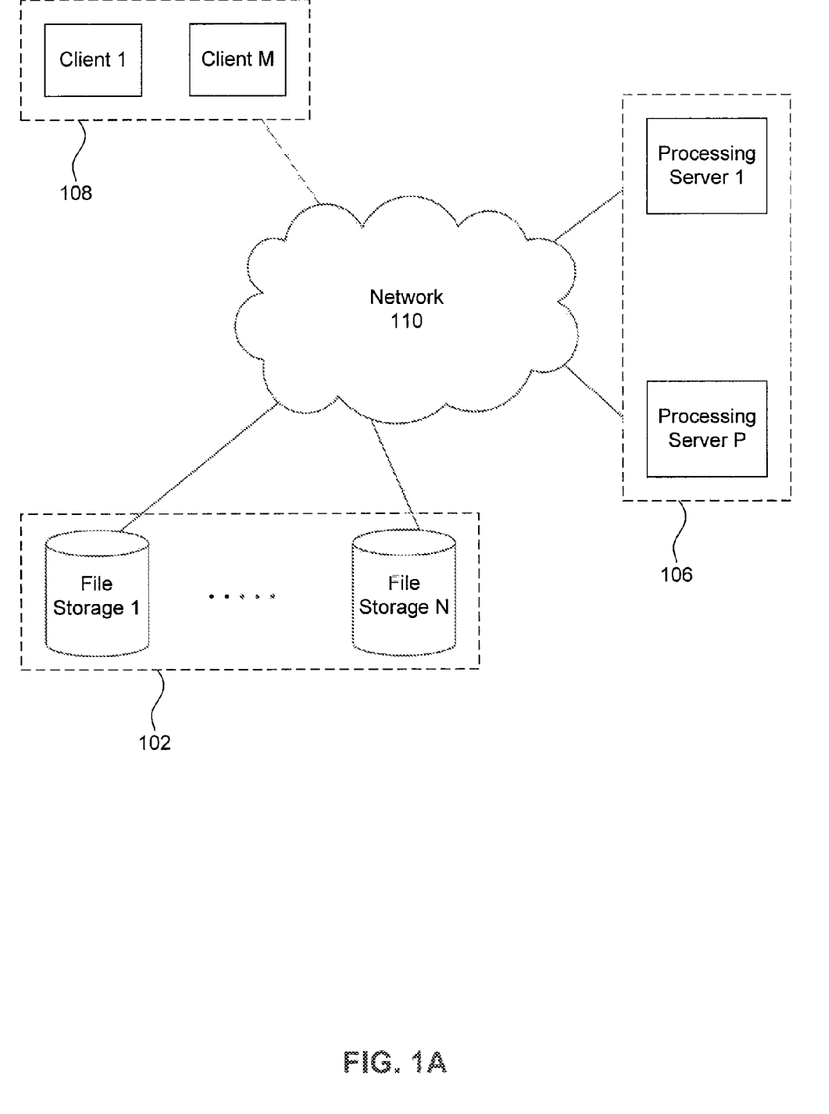
FIG. 1A illustrates a network environment for processing a collection of files, such as, for example, a collection of individual emails, according to an embodiment.

FIG. 1A illustrates a network environment 100 in which embodiments may be executed. Network environment 100 includes a plurality of file storage locations 102 (identified as file storage 1 . . . N) and a plurality of processing servers 106 (identified as processing server 1 . . . P) interconnected by a network 110.

File storage 102 can include file servers, disk drives in user computers including mobile computers, and/or other digital storage devices. File storage 102 can have stored on them documents, such as text documents, and multimedia documents that also include text. The stored documents may be in any storage format.

Processing server 106 can include one or more server computers, personal computers, or other computing devices which can execute the embodiments to detect the presence of predetermined keywords and expressions. Processing server 106 may comprise one or more computers in a server farm or cloud computer.

Network 110 can include one or more wide area networks and/or local area networks interconnecting file storage 102 and processing server 106. The Internet and a multi-site geographically distributed corporate network are exemplary wide area networks. An Ethernet and/or wireless network at a single site of an organization and a network at a home are exemplary local area networks.

A plurality of clients 108 (identified as clients 1 ... M) may communicate with one or more of processing server 106 to query documents in file storage 102 and to receive the results of such queries. Clients 108 can include personal computers, mobile computers, and the like through which users can query the documents in file storage 102.

Figure 1B:
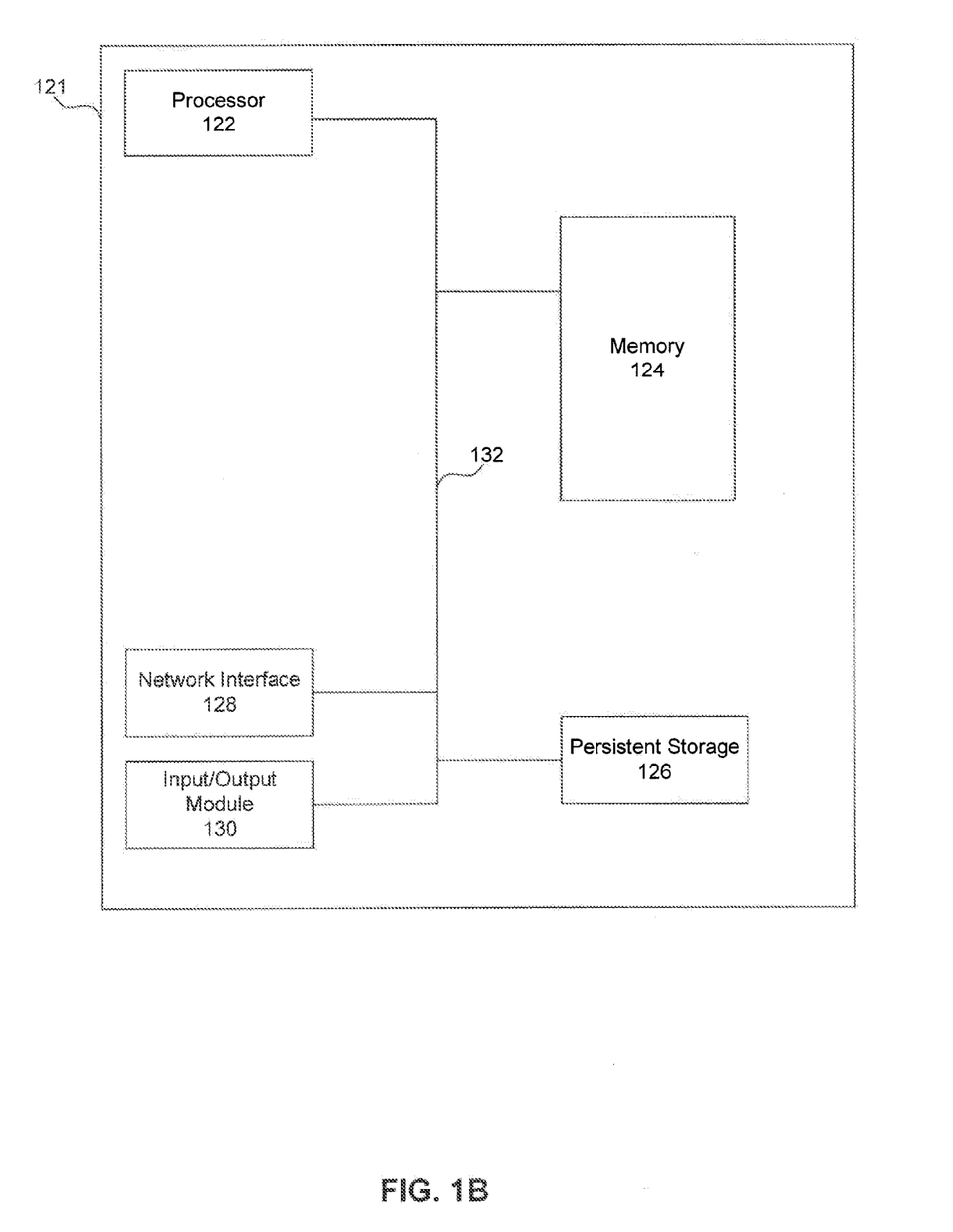
FIG. 1B illustrates a computer system in which an embodiment may be executed.

FIG. 1B illustrates a computer system 121 in which embodiments can be executed to efficiently detect the presence of predetermined keywords or expressions in large document archives. Computer system 121 includes a processor 122 which may include any computer or electronic processor for executing logic instructions and/or processing information, including text information. Processor 122 may include or be part of any device capable of processing any sequence of instructions. Processor 122 may include, for example, a computer processor, a processor in a mobile device or other electronic and/or digital processor. Processor 122 may, for example, be included in a computer, a mobile computing device, a set-top box, an entertainment platform, a server, a server farm, a cloud computer and the like.

Processor 122 may be connected to a memory 124 via a bus 132. Memory 124 may include volatile memory, persistent, virtual or otherwise, to store information for use by or output by the system 121. Memory 124 may include, for example, random access memory (RAM) and/or dynamic RAM (DRAM). Memory 124 may be used to store any information, such as state information of system 121. Memory 124 may, for example, may also be used to store instructions of computer system 121, including instructions of file processing system 200 illustrated in FIG. 2. Computer system 121 may include one or more processors 102 as necessary or appropriate.

Bus 132 may include a communication infrastructure that allows interaction between the various components of computer system 121. Bus 132 may, for example, carry data between the components of computer system 121, such as between processor 122 and memory 124. Bus 132 may include a wireless and/or wired communications medium between the components of computer system 121, and may include parallel, serial or other topological arrangements.

A persistent storage 126 may include components such memory or other persistent storage as is used by system 100 to store data over some extended period of time (e.g., as compared to memory 124). Persistent storage 126 may include non-volatile main memory as used by processor 122 in computer system 121. Persistent storage 126 may include, for example, flash memory, a hard disk, optical disk or other computer-readable storage medium.

Network interface 128 can be one or more of a wired or wireless network interface that couples computer system 121 to one or more other computer system directly or indirectly through a network such as network 110.

Input/output module 130 can be one or more of an interface to input devices such as keyboard, mouse, and the like, and output devices such as display, external hard drives and the like.

Figure 2:
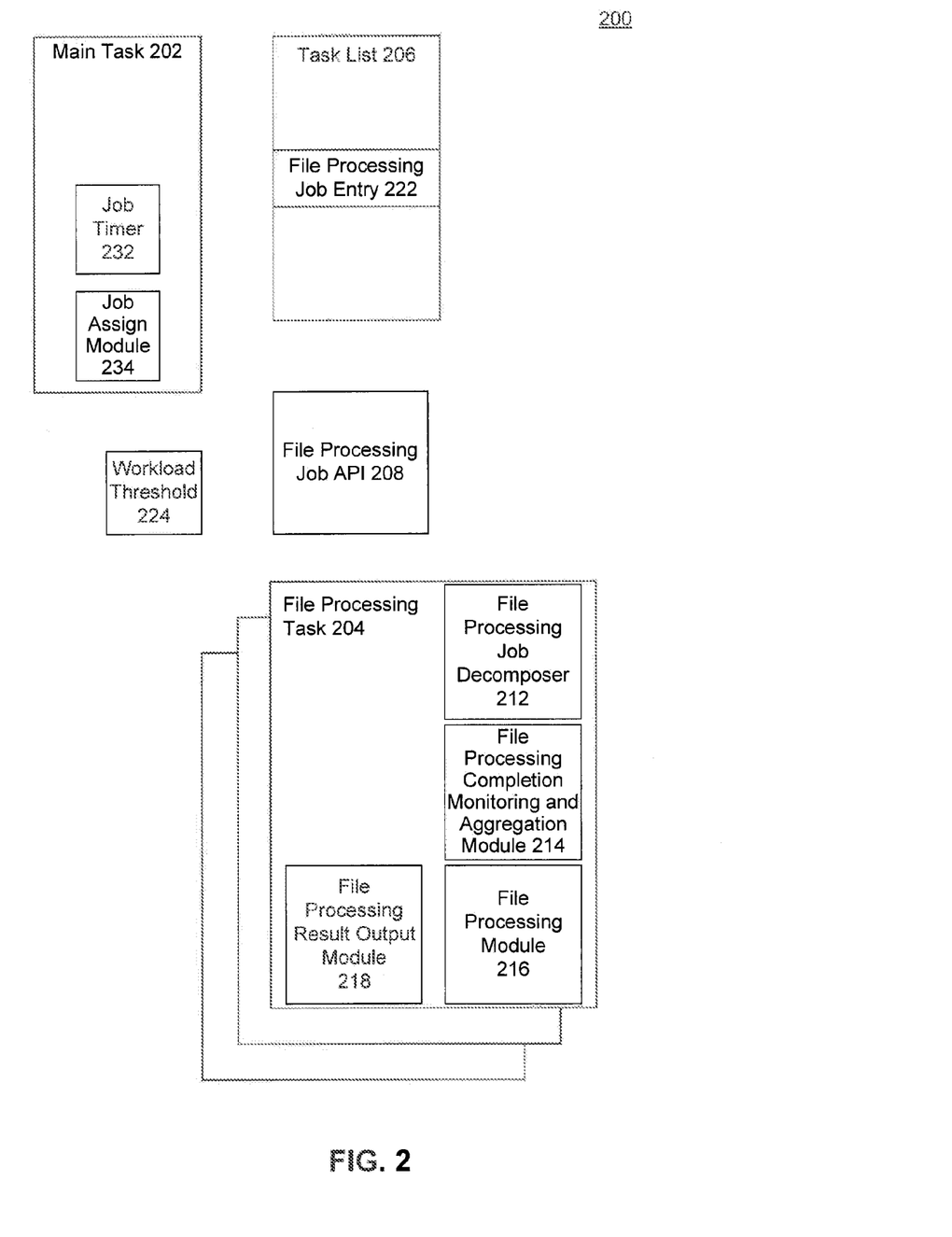
FIG. 2 illustrates a system for processing a collection of files, according to an embodiment.

FIG. 2 illustrates a system for processing a collection of documents, according to an embodiment. System 200 includes a main task 202, and one or more file processing tasks 204. System 200, for example, can be executed in one or more of processing servers 106 using computer system 121 described above. System 200, when executed by one or processing servers 106, operates to process collections of documents stored in file storage 102 in order to select documents in which one or more keywords or expressions of interest are present.

In the present disclosure, the terms "job" and "sub-job" refer to work, such as, but not limited to, processing one or more files, to be performed. A job can be subdivided into two or more sub-jobs. It should be noted that a sub-job represents a subdivided job, and is itself considered a job. The terms "task" and "sub-task" refer to processes that, for example, process the jobs and sub jobs respectively. A sub-task is a task that is spawned by, or at the request of, a task, and is itself considered a task.

Main task 202 and file processing tasks 204 cooperate to process a collection of documents by distributing the processing of documents among file processing tasks 204. Main task 202 operates to manage a task list 206 which includes a list entry, illustrated, for example, as file processing job entry 222, for each job. Main task may operate also to start one or more file processing tasks 204. Main task 202 may include a file processing job application programming interface (API) 208 that enables message exchange between file processing tasks and main task 202. File processing job API 208 provides an interface to the task list 206 that may be used to insert, delete, retrieve and modify the list entries 222. The interface provided by the API 208 can be used by the file processing tasks 204 using a communication method such as exchanging messages, remote procedure calls, and the like.

Main task 202 may also include job assign module 234 and job timer 232. Job assign module 234 operates to select a job from the task list to be assigned to a file processing task. For example, upon receiving a request for a job assignment from a file processing task, main task may use job assign module 234 to select the job from those available in task list 206. Job timer 232 operates to timestamp list entries in task list 206, and to provide a timer to main task 202 that can periodically be used to determine the status of jobs in task list 206.

File processing tasks 204 perform the processing of the documents to detect the presence of selected keywords or expressions in those documents. File processing tasks 204 operate further to decompose jobs that are determined to be larger than a workload threshold 224. Workload threshold 224 may be a configurable parameter. Workload threshold 224 may specify the threshold beyond which a workload or job is considered too large based upon, for example, one or more of a total size of the documents to be processed, the number of the documents to be processed, the number of queries, and the length of the queries. The decomposed jobs are processed by the same file processing task 204 that did the decomposition, or other file processing tasks 204.

File processing tasks 204 may include a file processing job decomposer 212, a file processing completion monitoring and aggregation module 214, a file processing module 216, and file processing result output module 218.

File processing job decomposer module 212 operates to determine if a job assigned to a task is too large and if so, to decompose the assigned job to multiple sub-jobs. The determination whether to decompose the task may be based upon one or more factors, such as, number of file processing tasks, the loading of the current file processing tasks, the number of jobs listed in task list 206, a total size of the documents to be processed, the number of the documents to be processed, the number of queries, and the length of the queries. The individual sub-jobs can then be added to task list 206, so that the same file processing task or any other file processing task may be assigned the decomposed sub-jobs.

File processing completion monitoring and aggregation module 214 operates to determine the completion of processing of decomposed sub-jobs by tasks, and if necessary and appropriate, aggregate the results of various tasks that processed the sub-jobs. The completion of processing of a sub-job may be determined, by other tasks, based upon the results for that sub-job written to a predetermined location. The completion of a sub-job may also be determined based upon the corresponding list entry 222 in the task list 206.

File processing module 216 operates to perform the processing of each file. The processing, according to an embodiment, is to detect the presence of query terms, such as, keywords and expressions, in any of the documents in a collection of documents. Each file processing task 204, may use file processing module 216 to process the one or more files assigned to it.

File processing result output module 218 writes the output of the processing of each task to a corresponding result output location. According to an embodiment, the result output location for each job or sub-job is specified in the corresponding list entry 222 in task list 206.

Figure 3:
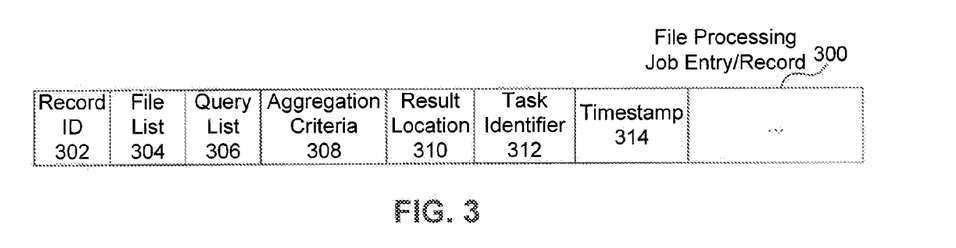
FIG. 3 illustrates an entry in a task list, according to an embodiment.

FIG. 3 illustrates an entry in a task list, according to an embodiment. For example, job record 300 can be a list entry, such as list entry 222, in a task list 206. For each job and sub job that is currently executing and for each of the jobs and sub-jobs that are currently known and scheduled to execute, a corresponding entry may exist in the task list, such as, task list 206. Job record 300 may include a record identifier 302, a file list 304, a query list 306, aggregation criteria 308, result location 310, task identifier 312 and timestamp 314.

Record identifier 302 can be a numeric or other identifier that uniquely identifies each record. File list 304 is the list of files to be processed for the job. File list 304 may include one or more files. According to an embodiment, file list 304 may include one or more emails or email archives. The task which is assigned the job corresponding to job record 300 may determine whether the workload is too big based upon the list of files assigned to it. The files to be processed in a job may include files from one or more storage locations.

Query list 306 is the list of queries to be performed upon each of the files specified in file list 304. A query can be represented by a keyword or expression. According to an embodiment, the query may include a keyword or expression to be sought in the collection of emails to be analyzed.

Aggregation criteria 308 specifies how the results for the corresponding job are to be aggregated. For example, aggregation may be based upon the entire collection of documents, and/or based upon one or more fields of the documents. A file processing task, that has created sub-jobs and is monitoring the completion of the tasks that are processing the subtasks, may perform aggregation by combining the results generated from two or more sub-jobs in order to determine the result for its assigned job.

Result location 310 specifies where the results are to be written. The task executing the job corresponding to the record is expected to write the results to the specified location. When a task, instead of executing the job corresponding to the record, determines that the job can be broken down into a plurality of sub-jobs, it can monitor the progress and eventual completion of the respective sub-jobs based upon the results location 310 assigned to them.

Task identifier 312 specifies the file processing task that has been assigned to process the job corresponding to the record. The task identifier may be written to the record when the job is assigned to the task. A task identifier uniquely identifies a task.

Timestamp 314 records the time the job was assigned to a task. According to another embodiment, timestamp 314 is periodically updated with a current timestamp. The timestamp 314 field may be used to detect jobs that have been assigned to tasks but are not being processed currently.

Figure 4:
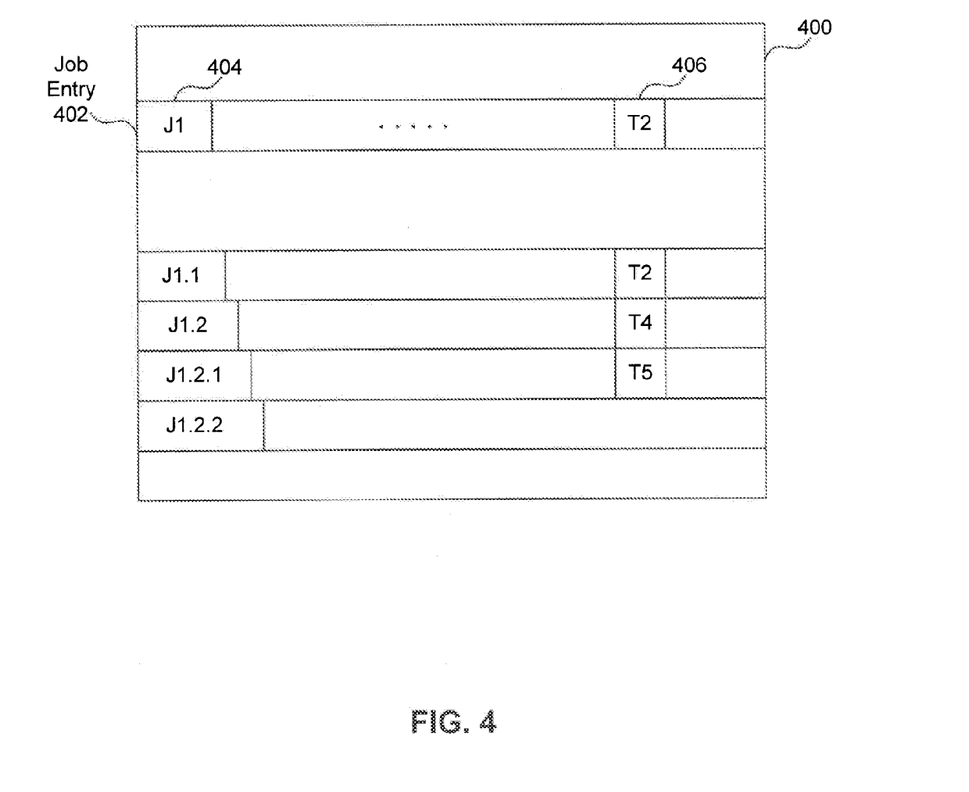
FIG. 4 illustrates a task list, according to an embodiment.

FIG. 4 illustrates a task list format 400, according to an embodiment. Task list format 400 may be an example format in which task list 206 can be implemented. Task list format 400, illustrates a plurality of job entries 402 in the task list. As described above, a job that needs to be performed is inserted into the task list. The task that is assigned the job may then determine that the size of the workload of the job is too great for the job to be handled by one task, and decomposes the first task to a plurality of sub-tasks. The sub-tasks are also entered into the task list. Job records corresponding to the sub-tasks may be inserted in the task list by the task that decomposed the job, and to which the job has been assigned. The insertion may be performed using an API, such as file processing job API 208.

As described above, each job entry includes a job identifier 404 and, among other fields, a task identifier 406. In the exemplary task list format 400 shown, task T2 has been assigned job J1. Task T2 has decomposed job J1 to sub-jobs J1.1 and J1.2 and respectively assigned J1.1 to task T2 and J1.2 to task T4. Job J1.2 has been decomposed into jobs sub jobs J1.2.1 and J1.2.2. Sub-job J1.2.1 has been assigned to T5 and sub job J1.2.2 is yet unassigned. The task list format 400 illustrates that, in some cases, the task (e.g., T2 in FIG. 4) may be assigned one of the decomposed sub-jobs that it itself decomposed. Task list format 400 further illustrates that in other cases, the task that decomposes a job (e.g., T4) may not be assigned one of the decomposed sub-jobs.

Figure 5:
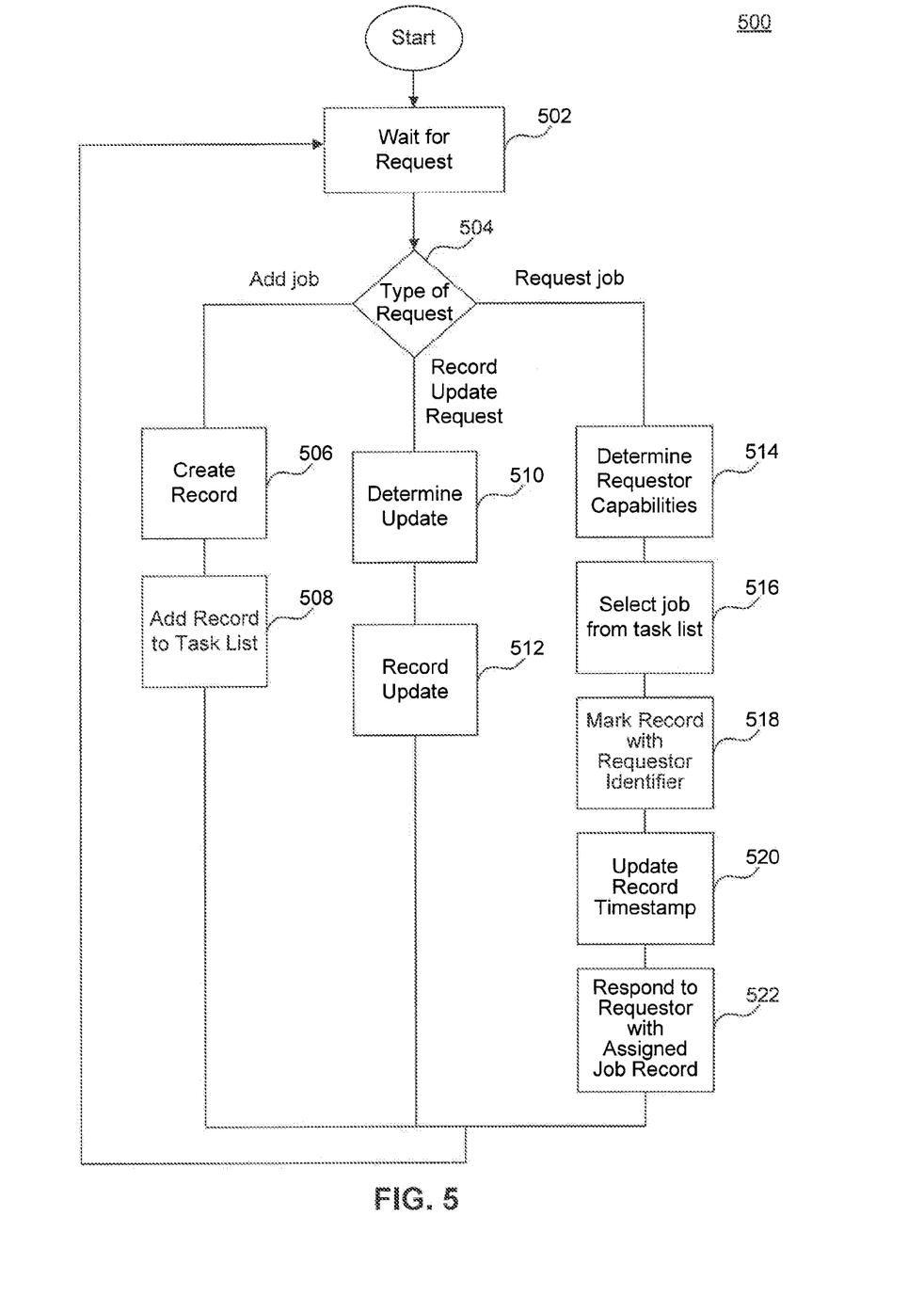
FIG. 5 illustrates a method for processing a collection of files, according to an embodiment.

FIG. 5 illustrates a method (steps 502-522) for processing a collection of documents according to an embodiment. Method 500 illustrates the processing performed by the main task 500. According to an embodiment, steps 502-522 illustrated in FIG. 5 can be performed by main task 202 shown in FIG. 2.

At step 502, the main task waits for an incoming request from a file processing task. For example, main task 206, illustrated in FIG. 2, can be waiting for messages from any of the file processing tasks 204. Waiting for an incoming request may be performed by being in a loop or by registering a callback function which is to be triggered when a message from a file processing task is received. When a message is received, method 500 proceeds to step 504.

At step 504 it is determined what type of file processing request has been received. The type of the message can be determined, either based on a header field in the incoming message or based on an analysis of the content of the request. The types of messages that may be received at step 504 include, but are not limited to, a request to add a new file processing job to the task list, a request to update a job record, or a request for a job to process.

When a request to add a new file processing job to the task list is received, then method 500 proceeds to step 506. At step 506, a new job record is created for the job that is requested to be added. An exemplary job record 300 is illustrated in FIG. 3.

The request to add a new file processing job may be for a new file processing job, or for a sub job created by decomposing an already existing job. The creation of sub-jobs by decomposing a job is further described below in relation to FIG. 6.

The request may specify whether it is a new job or a decomposed sub-job. The request may further specify the one or more files to be processed, the one or more queries to be executed, aggregation criteria, and a location to write the results to. Based upon the information included in the request, the main task generates a new job record.

At step 508, the new job record is added to the job list. The new record may be added to the task according to any known record maintenance discipline. In some embodiments, records related to a job and any of its sub-jobs may be grouped together. According to another embodiment, records are added to the end of the job list in the order received.

When a request to update a job record is received at step 504, then method 500 proceeds to step 510. A request to update a job record may be received in order to, for example, update the timestamp of the record, to update a completion status of a job, or to remove the job record from the job list.

A timestamp update request may be received, for example, in some embodiments in which long running jobs are being executed by file processing tasks, so that the timestamp of the job record can be periodically updated to indicate to the main task that the task processing the job is alive.

An update to the completion status may include updating a record related to a sub-job. For example, upon completing a sub-job, a file processing task may, in addition to writing results to the designated location, request a status update to be recorded in the corresponding record in the job list. An updated status in the job record may be used in some embodiments to indicate to a parent file processing task that a sub-job has completed execution, and/or as a means of indicating the status to the main task which may periodically purge records of completed tasks from the job list.

At step 512, the corresponding job record in the job list updated according to the type of update requested. As described above, the update may be to a field of the record (e.g., timestamp or status fields) or to delete the record from the job list.

When a request for a job to process is received at step 504, then method 500 proceeds to step 514.

At step 514, optionally, the main task may determine a set of capabilities of the requesting file processing task. For example, the determined capabilities may include, but are not limited to, total processing capacity and/or the current remaining processing capacity of the computer on which the requesting file processing task is executing, the location of the files to be processed in the job relative to the location of the computer on which the requesting file processing task is executing, and the result output locations relative to the location of the computer on which the requesting file processing task is executing. The capabilities may be determined based upon information provided by the requesting task or based upon a lookup table or the like.

At step 516, a job from the job list is selected and assigned to the requesting file processing task. According to an embodiment, the jobs in the job list are ordered according to when they were added, and the next available job is selected and assigned to the requesting file processing task.

According to another embodiment, the main task may consider one or more capabilities of the requesting task, and select a job according to the determined capabilities. For example, the main task may include logic to determine one or more of the capabilities related to the requesting file processing task and may select a job to be assigned based upon the determined capabilities. Example selection considerations may include selecting a job with a size in proportion to the current available capacity of the task, selecting a task based on its proximity to the set of files to be processed in the job, or selecting a task based on its proximity to the results location.

At step 518, the selected job record is marked with the identifier for the requesting task. The task identifier uniquely identifies the task within the system at least for the duration of the processing of the job.

At step 520, the timestamp of the selected job record is updated with the current time to reflect the time at which the job was assigned to the selected task.

At step 522, a response is generated and sent to the requesting task. The generated response includes the assigned job record, the information from the job record, and other means through which the file processing task can obtain the necessary information from the job record.

After the completion of any of the steps 508, 512, or 522, the main task may return to step 502 to wait for the next request from a file processing task.

Figure 6:
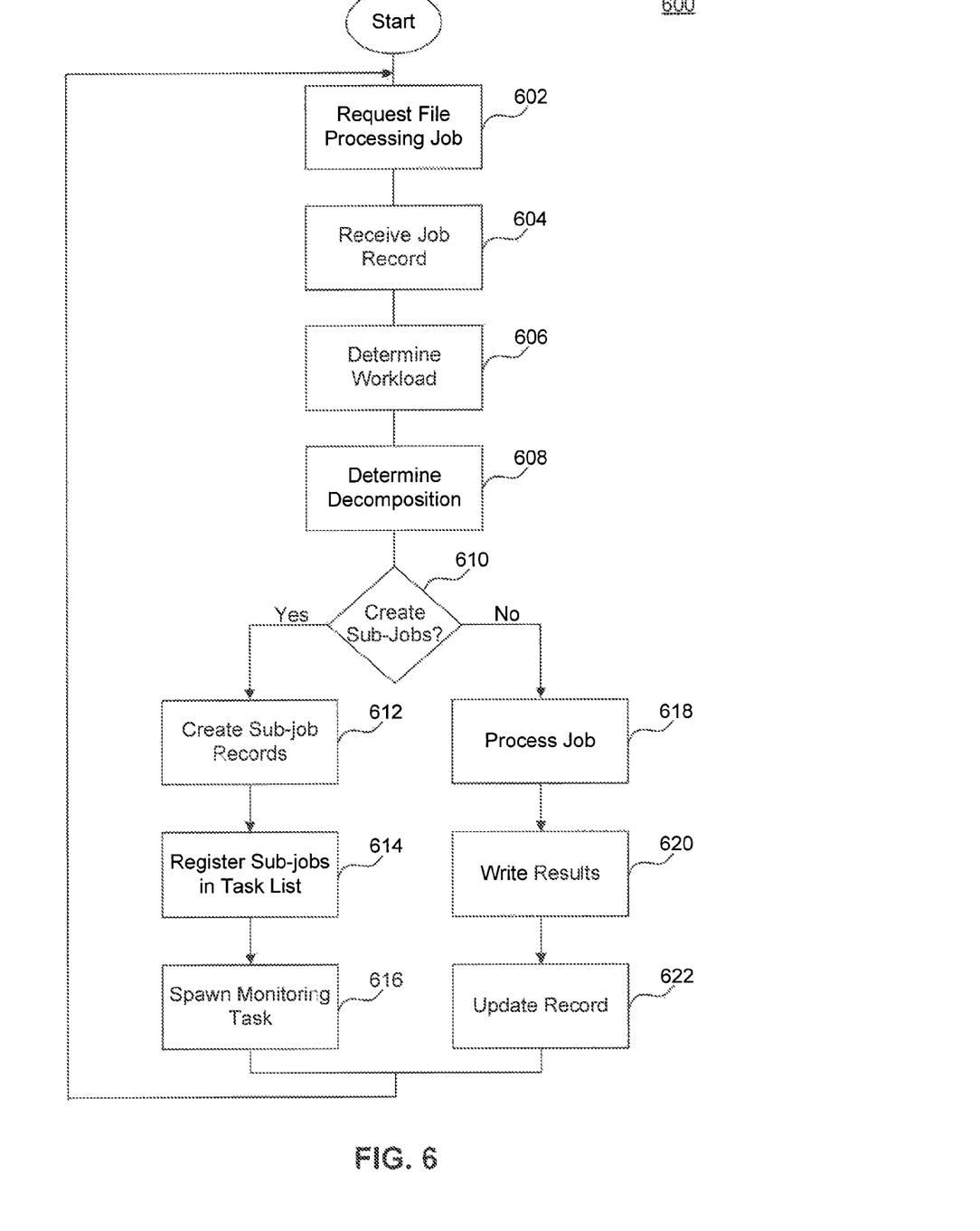
FIG. 6 illustrates a method for a task to process a file, according to an embodiment.

FIG. 6 illustrates a method for a file processing task to process a job, according to an embodiment. Method 600, for example, may be executed by any of file processing tasks 204.

At step 602, a file processing task requests a file processing job from the main task. The file processing task may request a job immediately upon startup, or upon completion of an assigned task. A file processing task may periodically issue a request to the main task until it is assigned a job. According to an embodiment, the request may indicate information related to the capacity of the computer on which the requesting task is executing, and/or other information that can be used by the main task to select a job to be assigned.

At step 604, the requesting file processing task receives a job from the job list maintained by the main task. According to an embodiment, the corresponding job record from the job list is returned in whole or in part. In other embodiments, the message received by the requesting task includes the necessary information regarding the job, or information as to how to obtain information that is necessary to process the assigned job.

At step 606, the file processing task determines the workload associated with the assigned job. In this step, the workload associated is compared to a workload threshold. The workload threshold may be a configuration parameter associated with the system, with the particular computer on which the file processing task executes, or the file processing task itself. The comparison may be based, for example, on one or more of the size of the documents to be processed and the number and size of the queries to be ran over the documents. Exemplary measures on which the comparison may be based include the number of documents multiplied by the number of queries, and the total size in bytes of the documents multiplied by the number of keywords and expressions in the queries.

At step 608, it is determined whether the workload associated with the assigned job is too great for the file processing task. The determination may be based upon the outcome of the comparison performed at step 606. In some embodiments, additional considerations may be factored into the determination whether the workload is too great for the task to process at the current time. For example, current utilization of the processor on which the file processing task will execute may be considered even if the comparison at step 606 indicated that the workload is lower than the threshold. Based upon the comparison at step 606 and, optionally, based on additional considerations, at this step it is determined whether the assigned job needs to be decomposed to sub-jobs.

At step 610, it is determined whether to create sub-jobs, and if so, how the sub-jobs are constituted. If it is determined that no sub-jobs are to be created, then method 600 proceeds to step 618. For example, if the determination at step 608 was that the workload associated with the job is not too great for the task to handle, then at step 618 the job is processed in the form in which it was assigned to the file processing task.

The processing of the job may include any type of processing that can be parallelized. According to the described embodiments, the processing includes detecting the presence of keywords and/or expressions in an archive of documents, such as, for example, an email or collection of emails. Each file processing task may execute a subset of the queries upon a subset of the documents.

At step 620, results from the processing of step 618 are written. The results may be written to a location specified in the job record. The results, for example, can include what documents included a presence of each of the query terms.

At step 622, the file processing task initiates the update of the corresponding job record in the job list to reflect the completion of the task. The update may be performed using a message and/or other API call to the main task. The update can include updating a status in the corresponding job record in the job list to reflect the completion of processing. In some embodiments, a timestamp in the job record may be updated to reflect the processing completion time. In some other embodiments, updates to other fields such as the result location field, files to process field, or list of queries field may be performed so as to reflect what was actually performed by the task during the processing. After sending the update record message to the main task, the file processing task returns to step 602 to initiate the request for the next file processing job.

If, at step 610, it was determined that sub-jobs are to be created, then method 600 proceeds to step 612. At step 612, a decomposition of the currently assigned job's workload is determined. For example, the job may be decomposed into two or more sub-jobs based upon the size of the job. The size of each decomposed sub-job may be based upon a default configuration or a workload level associated with the workload threshold configured for the current file processing task. Based on the determined decomposition, respective messages may be created to send the information regarding each of the sub-jobs to the main task. The decomposition may allocate subgroups of the files to be processed and subgroups of the queries to be processed to the respective sub-jobs. The messages may include information as to the allocated files to be processed and the allocated queries for each sub-job. According to an embodiment, the file processing task may create job records, such as records in the format shown in FIG. 3, for each of the decomposed jobs.

At step 614, the file processing task registers each of the sub-jobs in the job list maintained by the main task. According to an embodiment, the registering of a sub-job includes sending a message to the main task to insert the corresponding job record into the job list.

At step 616, file processing task may start a monitoring task to monitor the status of the sub-jobs. The monitoring, for example, may include monitoring the result output location for each of the decomposed sub-jobs. Monitoring is further described in relation to FIG. 7 below.

Figure 7:
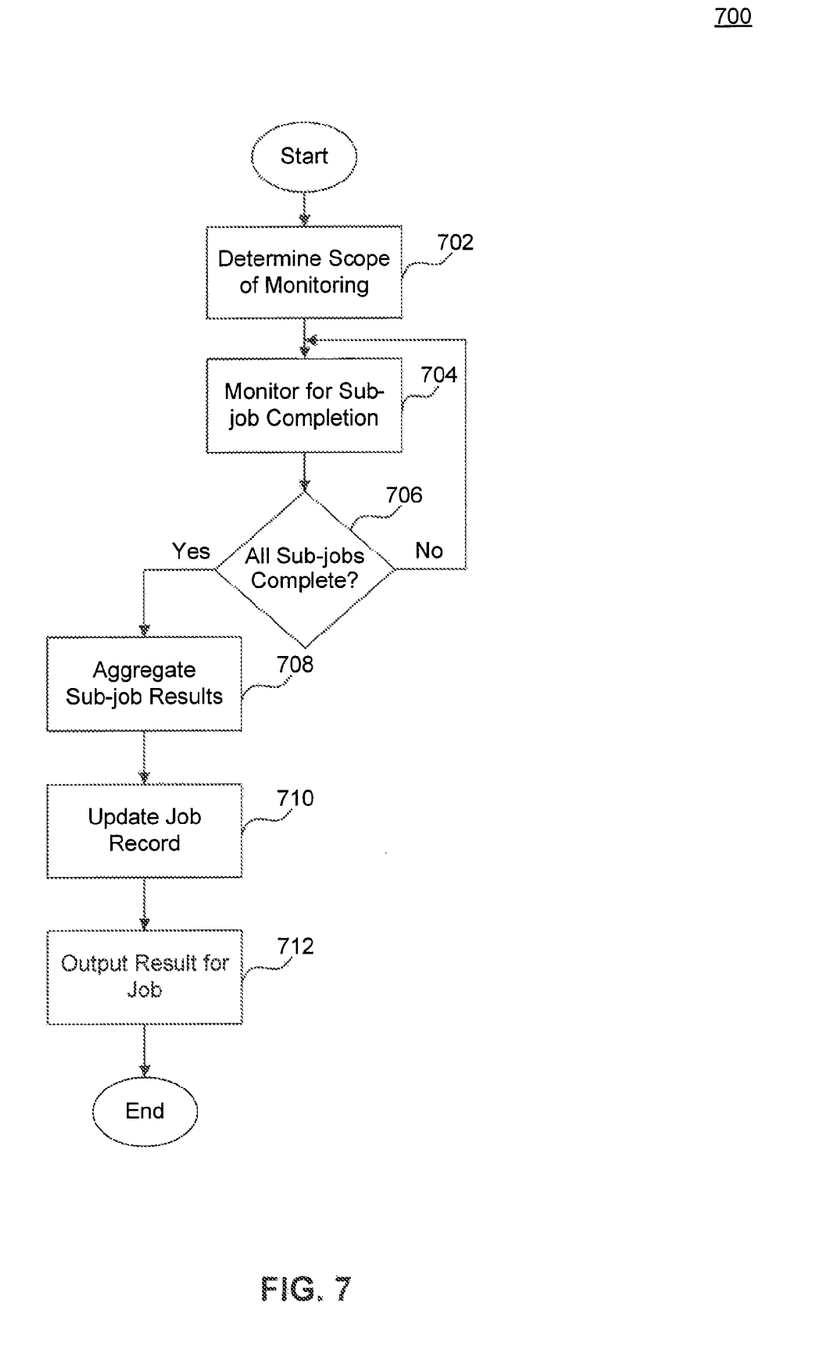
FIG. 7 illustrates a method for monitoring for the completion of sub-tasks and aggregation of results, according to an embodiment.

FIG. 7 illustrates a method 700 for monitoring the completion of sub-tasks and aggregation of results, according to an embodiment. As described above, a file processing task that decomposed a job into a plurality of sub-jobs can initiate a monitoring task to detect the completion of processing of the plurality of sub-jobs.

At step 702, the scope of the monitoring to be performed is determined. The scope of monitoring includes determining the number of sub-tasks to be monitored and the result locations and/or job list entries to be monitored. According to an embodiment, a file processing task that performs the decomposition of a job into a plurality of sub jobs would monitors the completion of each of the plurality of sub-jobs.

At step 704, the sub-jobs are monitored for completion. The completion of each sub-job can be monitored based on the results written to the result location specified for each sub-job. For example, the results written can include a completion marker that indicates a completion status, which can be read by the monitoring task.

Sub job completion can also be monitored based upon the respective job records in the job list maintained by the main task. For example, as described above, in some embodiments a status field in the corresponding job record may be updated by a task that completes processing of a sub-job.

When a completion of a sub-task is detected, method 700 proceeds to step 706. At step 706, it is determined whether all sub-jobs of the corresponding job have completed processing. If there are still some sub jobs that have yet to complete processing, then method 700 returns to monitoring at step 704.

If it is determined, however, that all sub-jobs have completed processing by their respective tasks, then at step 708, the results of the sub jobs are aggregated. Aggregation of the results of the sub jobs can include the gathering of results from multiple result output locations and combining them as appropriate. If the current job itself is a decomposed sub-job of another job, then the aggregated results may be written to a specified result output location from which the second task will gather the written results for another level of aggregation.

At step 710, after completing the aggregation of the results, the current file processing task proceeds to update the corresponding job record in the job list. For example, the job record can be updated to reflect that the job has completed processing. Note that the completion of the processing of the job is based upon the completion of the processing of all sub-jobs.

At step 712, the result for the job is output. The output result can be the aggregated results of all the sub-jobs. Based on whether the current job itself is a sub job of a second job, the output may be monitored by a second task which will proceed to aggregate the result.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for processing data files, comprising:
retrieving a first file processing job from a job list by a first file processing task of a plurality of file processing tasks, wherein the job list comprising file processing jobs is populated by a main task upon startup of the main task, and wherein the job list is further populated with dynamically listed file processing tasks, wherein the dynamically listed file processing tasks are entered into the job list through an application programming interface;
decomposing the first file processing job to a plurality of sub-jobs by the first file processing task when a workload associated with the first file processing job exceeds a threshold;
listing the plurality of the sub-jobs in the job list;
monitoring timestamps associated with the file processing jobs in the job list of at least one result storage location by the first file processing task for results from execution of respective ones of the plurality of sub-jobs by one or more second file processing tasks;
responsive to one of the timestamps, determining that a task to which a corresponding job is assigned is not responding;
responsive to a request by a second file processing task, assigning the corresponding job to the second file processing task;
recording the assignment of the job in the job list;
detecting completion of the first processing job based upon the monitoring; and
outputting a result for the first file processing job based upon the results from execution of respective ones of the plurality of sub-jobs.

2. The method of claim 1, wherein the decomposing comprises:
determining the workload based upon a number of files to be processed in the first file processing job; and
comparing the workload to the threshold.

3. The method of claim 2, wherein the determining the workload is further based upon a number of queries to be processed in the first file processing job.

4. The method of claim 1, wherein the threshold is dynamically determined based upon a performance criteria.

5. The method of claim 1, wherein the threshold is dynamically determined based upon at least one of a plurality of file processing tasks and a number of processors upon which respective ones of the plurality of file processing tasks are executing.

6. The method of claim 1, wherein the retrieved first file processing job comprises a list of documents, a list of queries, and a storage location to which results data are to be written.

7. The method of claim 1, wherein the detecting completion of the first processing job comprises:
determining a completion status of each of the plurality of sub-jobs based upon the at least one result storage location or a task status recorded in the job list for respective ones of the plurality of sub-jobs.

8. The method of claim 1, wherein the outputting a result comprises:
aggregating the results from execution of respective ones of the plurality of sub-jobs; and
outputting the aggregated results.

9. The method of claim 8, wherein the aggregating the results comprises:
determining an aggregation criteria recorded in the file processing job; and
aggregating the results according to the determined aggregation criteria.

10. The method of claim 9, wherein the aggregation criteria specifies aggregation over a plurality of documents.

11. The method of claim 10, wherein the aggregation criteria further specifies aggregation over documents satisfying a file criteria.

12. The method of claim 1, wherein the first file processing job contains a location at which results are to be stored.

13. The method of claim 1, wherein the retrieving comprises:
recording a timestamp for the first file processing job in the job list, wherein the timestamp corresponds to the retrieving and an identity of the first file processing task.

14. A system for processing data files, comprising:
one or more processors;
one or more memories, each coupled to at least one of the processors;
a job list stored in one of the memories; and
a main task configured to cause, when executed by the one or more processors, the one or more processor to perform operations comprising:
populating the job list with file processing job records; and,
assigning file processing jobs from the job list to a plurality of file processing tasks configured to:
retrieve a first file processing job from a job list by a first file processing task of a plurality of file processing tasks, wherein the job list comprising file processing jobs is populated by a main task;
decompose the first file processing job to a plurality of sub-jobs by the first file processing task when a workload associated with the first file processing job exceeds a threshold;
list the plurality of the sub-jobs in the job list;
monitor timestamps associated with the file processing jobs in the job list of at least one result storage location by the first file processing task for results from execution of respective ones of the plurality of sub jobs by one or more second file processing tasks;
responsive to one of the timestamps, determine that a task to which a corresponding job is assigned is not responding;
responsive to a request by a second file processing task, assign the corresponding job to the second file processing task;
record the assignment of the job in the job list;
detect completion of the first file processing job based upon the monitoring; and
output a result for the first file processing job based upon the results from execution of respective ones of the plurality of sub-jobs.

15. An article of manufacture comprising a non-transitory computer readable storage medium having instructions encoded thereon that, when executed by a computing device, cause the computing device to perform operations comprising:
retrieving a first file processing job from a job list by a first file processing task of a plurality of file processing tasks, wherein the job list comprising file processing jobs is populated by a main task upon startup of the main task, and wherein the job list is further populated with dynamically listed file processing tasks, wherein the dynamically listed file processing tasks are entered into the job list through an application programming interface;

decomposing the first file processing job to a plurality of sub-jobs by the first file processing task when a workload associated with the first file processing job exceeds a threshold;

listing the plurality of the sub-jobs in the job list;

monitoring timestamps associated with the file processing jobs in the job list of at least one result storage location by the first file processing task for results from execution of respective ones of the plurality of sub-jobs by one or more second file processing tasks;

responsive to one of the timestamps, determining that a task to which a corresponding job is assigned is not responding;

responsive to a request by a second file processing task, assigning the corresponding job to the second file processing task;

recording the assignment of the job in the job list;

detecting completion of the first processing job based upon the monitoring; and outputting a result for the first file processing job based upon the results from execution of respective ones of the plurality of sub jobs.

* * * * *